United States Patent Office 3,458,477
Patented July 29, 1969

3,458,477
PROCESS FOR PREPARING UNSATURATED POLYESTERS BY REACTING OXYALKYLATED PHENOLS WITH HCHO AND FURTHER REACTING THE RESULTANT PRODUCT WITH UNSATURATED DICARBOXYLIC ACIDS OR ANHYDRIDES
Ernest C. Ford, Jr., and John D. Zech, Wilmington, Del., assignors to Atlas Chemical Industries, Inc., Wilmington, Del., a corporation of Delaware
No Drawing. Filed Mar. 15, 1966, Ser. No. 534,401
Int. Cl. C08g 17/10
U.S. Cl. 260—52    11 Claims

ABSTRACT OF THE DISCLOSURE

Process of preparing aromatic ether diols which comprises condensing an oxyalkylated monohydric phenol with an aldehyde in the presence of from about 0.02 to about 0.8 equivalents of an acid catalyst per mol of oxyalkylated monohydric phenol and in the presence of the water of reaction, wherein the amounts of oxyalkylated monohydric phenol and aldehyde used are dependent upon the nature of the oxyalkylated monohydric phenol used. The molar ratio of oxyalkylated monohydric phenol to formaldehyde is about 2 when the oxyalkylated monohydric phenol is substituted in one of the ortho or para positions, not more than about 2 when the oxyalkylated monohydric phenol is substituted in two of the ortho or para positions, and at least about 3 when the oxyalkylated monohydric phenol is unsubstituted in the ortho and para positions. Process of preparing unsaturated polyesters which comprises reacting a dicarboxylic acid or anhydride with a diol product prepared by the above-described process.

This invention relates to a process of preparing aromatic ether diols and more particularly to a process of preparing aromatic ether diols which are suitable as intermediates for the preparation of improved polyester resins.

In accordance with this invention a process is provided whereby suitable inexpensive oxyalkylated monohydric phenols are made into aromatic ether diols by condensing such oxyalkylated monohydric phenols with formaldehyde or a formaldehyde yielding compound. These diols may in turn be used in the preparation of unsaturated polyester resins by esterification of such a diol with an unsaturated dibasic acid.

It is known to oxyalkylate dihydric phenols such as Bisphenol A to obtain aromatic ether diols suitable for the preparation of unsaturated polyesters. However, the commercial availability of binuclear dihydric phenols has been very limited for technological and economic reasons. For example, phenol and mono-substituted phenols such as o-, m- and p-cresol react readily with formaldehyde under acidic conditions to yield phenolic resins known as the Novolak resins. While the molecular weight of these resins can be controlled somewhat by the adjustment of the ratio of the reactants, the reactivity of such phenols with formaldehyde is so great that it has not been possible to obtain dihydric phenols to the exclusion of higher condensation products by any practical method. This accounts for the lack of commercial availability of dihydric phenols derived from the condensation of formaldehyde and phenol or monosubstituted phenols. Since ketones are much less reactive with phenols than are the aldehydes, the reaction can be controlled to yield condensation products that are dihydric phenols with the substantial absence of higher condensation products. Thus, Bisphenol A, the condensation product of phenol and acetone, is the only binuclear dihydric phenol which has achieved any significant degree of commercialization and nearly all commercial epoxy resins, polycarbonate resins, aromatic unsaturated polyester resins and phenoxy resins are based on it.

While unsaturated polyester resins based on oxyalkylated Bisphenol A have achieved great commercial success because of their superior properties, chiefly chemical and corroison resistance, it is desirable to expand the utility of other binuclear aromatic structures which will lend other physical properties to the polyester resin, e.g., higher and lower heat distortion points, higher and lower viscosities in solution in vinyl monomers such as styrene, dialkyl phthalate, monochlorostyrene, etc., while maintaining or improving the high level of chemical and corrosion resistance.

Bisphenol A and binuclear dihydric phenols in general are high melting solids which present difficulties to the efficient oxyalkylation to produce aromatic diols suitable for the synthesis of unsaturated polyester resins. Because of the high melting points, the temperature of oxyalkylation must be high in order to obtain proper mixing and efficient contact with the alkylene oxide while maintaining proper temperature control over this highly exothermic reaction. Thus, Bisphenol A with a melting point of 155° C. and a decomposition temperature in the presence of basic oxyalkylation catalysts of 170° C. offers a rather narrow temperature range in which to operate satisfactorily. Consequently, it is desirable to find a route to aromatic diols which avoids the need to operate under such high temperatures with in rather narrow temperature limits. Additionally, it is desirable to obtain lighter colored aromatic diols than it is possible to produce under the high temperature conditions required for the oxyalkylation of the high melting binuclear dihydric phenols.

It has now been found that these advantages can be gained utilizing simple oxyalkylated monohydric phenols which are liquids or very low melting solids to obtain a family of aromatic diols in a process wherein an oxyalkylated monohydric phenol is condensed with an aldehyde such as formaldehyde to obtain the desired difunctional alcohols. This process by-passes the intermediate formation of the difficult to handle high melting binuclear dihydric phenols. The success of the process to produce diols rather than polyols of higher functionality, stems from the lower reactivity of oxyalkylated phenols toward formaldehyde thereby making it possible to stop the reaction at the diol stage in contrast to the reaction with phenols which cannot be so controlled.

A competing side reaction of oxyalkylated phenol with formaldehyde yielding formals must be taken into consideration since it can lead to undesirable by-products which lower the hydroxy number and lower the functionality thereby seriously degrading the properties of unsaturated polyesters derived therefrom. By proper choice of reaction conditions as hereinafter disclosed, this side reaction can be avoided or minimized to the extent that the resultant diol product is entirely satisfactory as a chemical intermediate for unsaturated polyesters.

An additional advantage of this process is that it permits the easy purification of the oxyalkylated phenol by distillation to obtain water-white oxyalkylated phenol from which extremely light-colored aromatic diol can be obtained. The distillation of oxyalkylated dihydric phenols such as 2 - oxyethylene Bisphenol A or 2-oxypropylene Bisphenol A to obtain light colored material is impractical because of the high viscosity and extremely high boiling points of these products.

Monohydric phenols especially suited for use in the present process are "blocked" monohydric phenols which are substituted in at least one but no more than two of their ortho or para positions by a hydrocarbon radical or halogen. Among suitable "blocked" monohydric phenols are, for example, o-cresol, p-cresol, 2,4-dimethyl phenol, 2,6-dimethyl phenol, o-ethyl phenol, o-isopropyl phenol, o-allyl phenol, p-tert butyl phenol, o-chlorophenol, p-chlorophenol, p-octyl phenol o-bromophenol and mixtures thereof. Additionally, phenol itself and m-cresol may be used in the subject process under specified conditions.

In the oxyalkylation of a monohydric phenol used in accordance with the present invention it is preferred to use ethylene oxide, propylene oxide and mixtures thereof. However, other alkylene oxides for example, 1,2-butylene oxide may be used. In the preparation of rigid polyesters, it is preferred to use an ether diol which has been prepared by using enough alkylene oxide to completely eliminate unreacted phenols from the composition. To insure this, it is customary to use slightly more than one mole of alkylene oxide per equivalent of monohydric phenol in a conventional base catalyzed oxyalkylation reaction. Where more flexible polyesters are desired larger amounts of alkylene oxides may be used up to about 8 moles per mole of monohydric phenols.

In the condensation of the oxyalkylated phenol with formaldehyde or a formaldehyde yielding compound according to the present invention it is preferred to use a strong acid or acidic salt as a catalyst. Particularly preferred is hydrochloric acid because it is volatile and easily removed by distillation from the condensation product. Other acids or highly acidic salts for example, sulfuric acid, phosphoric acid, zinc chloride or aluminum chloride may be used as a catalyst; however, in this case other methods must be employed to remove the acid from the resulting condensation product such as washing, or neutralization and washing or ion-exchange. In the condensation of an oxyalkylene phenol with an aldehyde in the present invention it is preferable that the reaction be carried out at temperatures from about 75° C. to about 150° C. Where it is desired to obtain the lightest colored product it is advantageous to carry out the present condensation reaction under an inert atmosphere.

Formaldehyde in the form of aqueous or alcohol solutions may be used, however, polymers of formaldehyde such as trioxane or paraformaldehyde are preferred sources of formaldehyde for reaction with oxyalkylene phenols in the process of this invention.

It has been discovered that when one ortho or para position of the oxyalkylated monohydric phenol being used is blocked the amount of condensing agent used should be suitably limited so as to not cause additional crosslinking resulting in the formation of polyols with a functionality greater than two. Therefore, in accordance with the present invention a molar ratio of about 2 moles of oxyalkylated phenol to about 1 mole of aldehyde is found to produce desired results when a mono-substituted monohydric phenol such as o-cresol is used as the phenolic reactant. If two of the three reactive positions of the monohydric phenol used are blocked, greater quantities of the condensing agent may be used since polycondensation is not possible but greater control must be exercised to avoid formal formation. However, the use of a molar ratio of more than about one mole of aldehyde to about two moles of an oxyalkylated phenol blocked in two of its three reactive positions will serve no useful purpose since it will be in excess of the stoichiometric quantity needed.

When using polyoxyethylene phenol, polyoxypropylene phenol or other unblocked oxyalkylene phenols such as oxyethylene m-cresol to prepare the diols of this invention it is necessary to use a substantial excess, preferably 50 to 100% excess of the oxyalkylene phenol during the condensation reaction with the aldehyde or a molar ratio of 3 to 4 moles of oxyalkylene phenol to one mole of aldehyde to suppress the formation of tri- and tetrafunctional condensates which make such products unsuitable for the preparation of unsaturated polyesters. Therefore, when using such ingredients, the excess oxyalkyl phenol is removed by vacuum distillation after the reaction with the aldehyde is complete.

The quantity of acid catalyst used is dependent upon the reaction conditions, principally time and temperature. Formal formation is an undesired side reaction which results from the reaction of the hydroxyl groups of the oxyalkylene radicals with formaldehyde under acidic conditions. However, this reaction is reversible so that the desired reaction can be forced to completion. Conditions which favor the desired reaction are prolonged reaction time, higher reaction temperatures, the amount of water and acid catalyst present in the reaction medium. Generally low amounts of acid coupled with low reaction temperatures (below 100° C.) favor considerable formal formation which can only be overcome by the use of excessively long reaction cycles. This is illustrated in Example XIV which shows the use of 0.03 equivalent of HCl per equivalent of oxyalkylated o-cresol wherein the product has a very low hydroxyl number 248 due to formal formation. On the other hand, small amounts of acid can be used satisfactorily as shown in Example XV by using a higher reaction temperature (120° C. in this case). Thus, within the context of the above discussion, the process of this invention can be successfully practiced with amounts of acid catalyst ranging from about 0.02 equivalent to about 0.8 equivalent per mole of oxyalkylated phenol at temperatures ranging from about 75° C. to about 150° C. When temperatures in excess of 100° C. are used, it is preferable to carry out the reaction under pressure to avoid loss of formaldehyde and to retain water in the reaction medium which is required to reverse the side reaction leading to formals.

In the preparation of unsaturated polyesters from the above described aromatic ether diols the oxyalkylated phenol is esterified with a suitable unsaturated dicarboxylic acid or anhydride. For example, maleic anhydride, fumaric acid, maleic acid or itaconic acid may be used. Generally, about a 1:1 ratio of unsaturated acid to condensed oxyalkylated phenol is used in the preparation of the present polyesters. However, the ratio of reactants may be suitably varied to yield polyesters of varying acid numbers according to the present invention. For example, the diols of this invention may be reacted with slightly less than a stoichiometrically equivalent quantity of an unsaturated dicarboxylic acid or anhydride to produce a polyester with a low acid number. The esterification of the oxyalkylated phenols of the present invention can be carried out in several ways such as:

(1) The "fusion" cooking technique with a blanket of an inert gas, (2) The azeotropic distillation technique for removal of water using a refluxing inert solvent or (3) By transesterification using esters of the unsaturated dibasic acids such as the dimethyl or diethyl esters.

In the direct esterifiaction processes, temperatures in the range of about 180° C. to about 220° C. may be customarily used. At these high temperatures crosslinking can occur via the unsaturation and it is desirable to use small percentages of polymerization inhibitors, for example, hydroquinone to minimize such polymerization during the esterification reaction. Generally, from about .01% to about 0.10% of a polymerization inhibitor is used based on the weight of the reactants. However, the preferred concentration used is in the range of about .05% on the weight of reactants.

The following examples will serve to illustrate the processes of the present invention for the production of improved aromatic ether diols and polyester resin product. Obviously, the present invention is not limited to the following specific examples since the ingredients utilized and reaction conditions set forth may be varied within the scope of the preceding disclosure.

EXAMPLE I 1232 grams (8 moles) of oxyethylene o-cresol having an average of 1.1 oxyethylene groups per molecule of o-cresol and 139 grams (4.4 moles) of 95% paraformaldehyde were charged to a two liter, three-necked flask equipped with stirrer, thermometer, carbon dioxide inlet and water cooled condenser. The stirrer was started and carbon dioxide was used to flush the flask. Then, the carbondioxide was turned off and 66 cc. concentrated hydrochloric acid was then added and the temperature raised to 80–85° C. and held for three hours. The temperature was then raised to 95–100° C. and held for an additional seven hours. The resulting condensate was washed three times with 500 cc. water. The condensate was then stripped of water at final conditions of 106° C. at 16 mm. vacuum. The final condensate product obtained weighed 1255 grams and was a viscous liquid having an acid number of 0.3 and a hydroxyl number of 334.

EXAMPLE II 1170 grams (3.48 moles) of the final condensate product obtained in Example I and 404 grams (3.48 moles) of fumaric acid were charged to a two-liter, three-necked flask equipped with stirrer, thermometer and carbon dioxide inlet. 0.3 gram hydroquinone were added. A carbon dioxide blanket of 200 cc./min. was charged into the flask and temperature raised to 180–185° C. in 45 minutes. The temperature was maintained at 180–185° C. for six hours. Then, the carbon dioxide flow was stopped and vacuum (14 mm.) applied and held for one hour. The resulting polyester product was a styrene soluble, light colored resin with the following constants: melting point 94° C., acid number 19, saponification number 267 and hydroxyl number 34.

EXAMPLE III 1312 grams (8 moles) of oxypropylene o-cresol having an average of 1.1 oxypropylene groups per molecule of o-cresol and 139 grams (4.4 moles) 95% paraformaldehyde were charged to a two-liter, three-necked flask equipped with stirrer, thermometer, carbon dioxide inlet and water cooled condenser. The stirrer was started and carbon dioxide used to flush the flask. Then, the carbon dioxide was turned off. 66 cc. concentrated hydrochloric acid was then added and temperature raised to 80–85° C. Temperature was held for three hours at 80–85° C. and then raised to 95–100° C. for an additional seven hours. The condensate obtained was washed three times with 500 cc. water. The condensate was then stripped of water at final conditions of 103° C. at 16 mm. vacuum. The final product was a viscous colored liquid having an acid number of 0.3 and a hydroxy number of 301.

EXAMPLE IV 1332 grams (3.7 moles) of the final condensate product obtained in Example III and 429 grams (3.7 moles) of fumaric acid were charged to a two-liter, three-necked flask equipped with stirrer, thermometer and carbon dioxide inlet. 0.34 gram hydroquinone were added as a crosslinking inhibitor. A carbon dioxide blanket of 200 cc./min. was charged into the flask and temperature raised to 180–185° C. in 45 minutes. The temperature was maintained at 180–185° C. for four hours; then to 195–200° C. and held for five hours. Then, the carbon dioxide flow was stopped and vacuum (14 mm.) applied and held for one and one-half hours. The resulting polyester product was a styrene soluble light colored resin with the following constants: melting point 98° C., acid number 21, saponification number 252, hydroxyl number 41.

EXAMPLE V 1110 grams (6 moles) of oxypropylene 2,5-xylenol having an average of 1.1 oxypropylene groups per molecule of 2,5-xylenol and 94.7 grams (3 moles) of 95% paraformaldehyde were charged to a two-liter, three-necked flask equipped with stirrer, thermometer, carbon dioxide inlet and water cooled condenser. The stirrer was started and carbon dioxide used to flush the flask. Then, the carbon dioxide was turned off and 150 cc. concentrated HCl was then added and the temperature raised to 80° C. An exotherm started and temperature was allowed to rise to 95–100° C. Temperature was held at 95–100° C. for 2 hours.

The resulting condensate was then stripped under vacuum to remove HCl and water at final conditions of 115° C. at 22 mm. vacuum. The final product was a light viscous liquid which had an acid number of 1.5 and a hydroxyl number of 295.

EXAMPLE VI 1126 grams (2.96 moles) of the final condensate obtained in Example V and 343 grams (2.96 moles) of fumaric acid were charged to a two-liter, three-necked flask equipped with stirrer, thermometer and carbon dioxide inlet. 0.68 gram hydroquinone was added to the above mixture. A carbon dioxide blanket of 200 cc./min. was charged into the flask and temperature raised to 180–185° C. in 45 minutes. Temperature was maintained at 180–185° C. for 2 hours; then raised to 195–200° C. and held for 7 hours. Then, the carbon dioxide flow was stopped and vacuum applied (18 mm.) and held for 2 hours. The resulting polyester product was a styrene soluble resin having the following constants: melting point 105° C., acid number 22, saponification number 229, hydroxyl number 37.

EXAMPLE VII 1014 grams (6 moles) of oxypropylene p-cresol having an average of 1.1 oxypropylene groups per molecule of p-cresol and 94.7 grams (3 moles) of 95% paraformaldehyde were charged to a two-liter, three-necked flask equipped with stirrer, thermometer, carbon dioxide inlet and water cooled condenser. The stirrer was started and carbon dioxide used to flush the flask. Then, the carbon dioxide was turned off and 100 cc. concentrated HCl was then added and the temperature raised to 80° C. An exotherm started and temperature was held by air cooling until the exotherm subsided. The temperature was held for two hours at 80–85° C. followed by eight hours at 95–100° C.

The resulting condensate was then washed twice with successive 300 cc. of water. The hydrochloric acid and water were then removed from the resulting mixture under vacuum at final conditions of 108° C. at 23 mm. vacuum. The final product was a light, viscous liquid which had an acid number of 0.5 and a hydroxyl number of 302.

EXAMPLE VIII 1010 grams (2.72 moles) of the final condensate obtained in Example VII and 315 grams (2.72 moles) of fumaric acid were charged to a two-liter, three-necked flask equipped with stirrer, thermometer and carbon dioxide inlet. 0.60 gram hydroquinone was added to the above mixture. A carbon dioxide blanket of 200 cc./min. was charged into the flask and temperature raised to 180–185° C. in 45 minutes. The temperature was maintained at 180–185° C. for two hours; then raised to 195–200° C. and held for six hours. Then, the carbon dioxide flow was stopped and vacuum applied (18 mm.) for two hours. The resulting polyester product was a styrene soluble resin with the following constants: melting point 84° C., acid number 25, saponification number 250, hydroxyl number 43.

EXAMPLE IX 1426 grams (9.08 moles) of oxypropylene phenol having an average of 1.1 oxypropylene groups per molecule of phenol and 71.7 grams (2.27 moles) of 95% paraformaldehyde were charged to a two-liter, three-necked flask equipped with stirrer, thermometer, carbon dioxide inlet and water cooled condenser. The stirrer was started and carbon dioxide used to flush the flask. Then, the carbon dioxide was turned off and 114 cc. concentrated hydrochloric acid was added and the temperature raised to 80° C. An exotherm started and temperature was held by air cooling until the exotherm subsided. Temperature was then raised to 100–105° C. and held for three hours. The hydrochloric acid and water were then removed from the resulting mixture at final conditions of 85° C. at 18 mm. vacuum.

The excess polyoxypropylene phenol was stripped from the resulting mixture at final conditions of 118° C. at <1 mm. vacuum. The final product was a clear, water-white, viscous liquid which had an acid number of zero and a hydroxyl number of 354. The product crystallized on standing at room temperature.

EXAMPLE X 586 grams (1.85 moles) of the final condensate obtained in Example IX and 209 grams (1.80 moles) of fumaric acid were charged to a one-liter, three-necked flask equipped with stirrer, thermometer and carbon dioxide inlet. 0.4 gram hydroquinone was added to the above mix. A carbon dioxide blanket of 100 cc./min. was charged into the flask and temperature raised to 180–185° C.; then raised to 195–200° C. and held for 7 hours. Then, the carbon dioxide flow was stopped and vacuum applied (18 mm.) for two hours. The resulting polyester was a styrene soluble, light colored resin with the following constants: melting point 105° C., acid number 19, saponification number 272, hydroxyl number 41.

EXAMPLE XI 1450 grams (10.0 moles) of oxyethylene phenol having an average of 1.1 oxyethylene groups per molecule of phenol and 79 grams (2.5 moles) 95% paraformaldehyde were charged to a two-liter, three-necked flask equipped with stirrer, thermometer and carbon dioxide inlet and water cooled condenser. The stirrer was started and carbon dioxide used to flush the flask. The carbon dioxide was then turned off and 125 cc. of concentrated hydrochloric acid added and temperature raised to 80° C. An exotherm started and temperature was held by air cooling until the exotherm subsided. The temperature was then raised to 100–105° C. and held for three hours. Water and the hydrochloric acid catalyst were stripped from the mixture at final conditions of 85° C. 18 mm. vacuum.

Then, the excess polyoxyethylene phenol was removed under <1 mm. vacuum at final conditions of 130° C. The final product was a clear, water-white, viscous liquid which had an acid number of 0.1 and a hydroxyl number of 381. This product crystallized on standing at room temperature.

EXAMPLE XII 604 grams (2.05 moles) of the final condensate obtained in Example XI and 232 grams (2.0 moles) of fumaric acid were charged to a one-liter, three-necked flask equipped with stirrer, thermometer and carbon dioxide inlet. 0.4 gram hydroquinone was added. A carbon dioxide blanket of 100 cc./min. was charged into the flask and the temperature raised to 180–185° C. in 45 minutes. The temperature was held for one hour at 180–185° C.; then raised to 195–200° C. and held for three hours. Then, the carbon dioxide flow was stopped and vacuum applied (18 mm.) for one hour. The resulting polyester product was a styrene insoluble, light colored resin with the following constants: melting point 98° C., acid number 26, saponification number 288, hydroxyl number 40.

EXAMPLE XIII 656 grams (1.94 moles) of the final condensate obtained in Example I and 191 grams (1.94 moles) maleic anhydride were charged to a one-liter, three-necked flask equipped with stirrer, thermometer and carbon dioxide inlet. 0.17 gram hydroquinone was added. A carbon dioxide blanket of 100 cc./min. was charged into the flask and temperature raised to 180–185° C. and held for five hours. Then, the carbon dioxide flow was stopped and vacuum applied (18 mm.) and held for one hour. The final polyester product was a styrene soluble, light colored resin with the following constants: melting point 91° C., acid number 17, saponification number 261, hydroxyl number 35.

EXAMPLE XIV

The process of Example I was repeated using 1232 grams of oxyethylene o-cresol, 132 grams of paraformaldehyde and 22 cc. of concentrated hydrochloric acid. After reacting at 80–85° C. for three hours, the temperature was raised to 95–100° C. for an additional seven hours. The product recovered after removal of acid and water had an acid number of 0.2 and a hydroxyl number of 248.

EXAMPLE XV

A 100 gallon glass-lined kettle was charged with 183.4 lbs. of distilled 1.1 oxyethylene o-cresol, 19.8 lbs. of flaked paraformaldehyde and 6.1 lbs. of technical grade hydrochloric acid (22° Baumé). The reaction kettle was closed and degassed after which it was heated with stirring to 120° C. and reacted for 2½ hours at 120–125° C. and 17 to 19 p.s.i.g. At the completion of the 2½-hour reaction period, vacuum was applied and the HCl catalyst and water were stripped out to terminal conditions of 100° C. and 10 mm. Hg absolute pressure. The product (200 lbs.) had an acid number of 0.96 and a hydroxyl number of 328. A similar run made at atmospheric pressure at 100–108° C. for five hours gave a product with a hydroxyl number of 300.

What is claimed is:

1. A process of preparing aromatic ether diols which comprises condensing an oxyalkylated monohydric phenol selected from the group consisting of
   (1) oxyalkylated monohydric phenols substituted in one of the ortho or para positions with a hydrocarbon radical or halogen,
   (2) oxyalkylated monohydric phenols substituted in two of the ortho or para positions with a hydrocarbon radical or halogen, and
   (3) oxyalkylated monohydric phenols which are unsubstituted in the ortho and para positions with formaldehyde or a formaldehyde yielding compound in the presence of from about 0.02 to about 0.8 equivalent of an acid catalyst per mol of oxyalkylated monohydric phenol and in the presence of the water of reaction, wherein the amounts of phenol and aldehyde are such that the molar ratio of oxyalkylated monohydric phenol to formaldehyde is about 2 when the oxyalkylated monohydric phenol is substituted in one of the ortho or para positions with a hydrocarbon radical or halogen, the molar ratio of oxyalkylated monohydric phenol to formaldehyde is less than about 2 when the oxyalkylated monohydric phenol is substituted in two of the ortho or para positions with a hydrocarbon radical or halogen, and the molar ratio of oxyalkylated monohydric phenol to formaldehyde is at least about 3 when the oxyalkylated phenol is unsubstituted in the ortho and para positions.

2. A process of claim 1 wherein the oxyalkylated monohydric phenol is an oxyalkylated monohydric phenol substituted in one of the ortho or para positions with a hydrocarbon radical or halogen and the molar ratio of oxyalkylated monohydric phenol to formaldehyde is about 2.

3. A process of claim 1 wherein the oxyalkylated monohydric phenol is an oxyalkylated monohydric phenol substituted in two of the ortho or para positions with a hydrocarbon radical or halogen and the molar ratio of oxyalkylated phenol to formaldehyde is less than about 2.

4. A process of claim 1 wherein the oxyalkylated monohydric phenol is an oxyalkylated monohydric phenol which is unsubstituted in the ortho and para positions and the molar ratio of oxyalkylated monohydric phenol to formaldehyde is at least about 3.

5. A process of claim 2 wherein the oxyalkylated monohydric phenol is an oxyalkylated ortho cresol.

6. A process of claim 2 wherein the oxyalkylated monohydric phenol is an oxyalkylated para cresol.

7. A process of claim 3 wherein the oxyalkylated monohydric phenol is an oxyalkylated 2,5-xylenol.

8. A process of claim 4 wherein the oxyalkylated monohydric phenol is an oxyalkylated hydroxybenzene.

9. A process of claim 1 wherein the acid catalyst is selected from the group consisting of hydrochloric acid, sulfuric acid, phosphoric acid, zinc chloride, and aluminum chloride.

10. A process of preparing a polyester which comprises reacting an ethylenically unsaturated dicarboxylic acid or anhydride with an aromatic ether diol product prepared by the process of claim 1.

11. A process of claim 10 wherein the ethylenically unsaturated dicarboxylic acid or anhydride is selected from the group consisting of maleic acid, maleic anhydride, fumaric acid, and itaconic acid.

References Cited

UNITED STATES PATENTS

| | | | |
|---|---|---|---|
| 2,485,097 | 10/1949 | Howland et al. | 260—845 |
| 2,880,187 | 3/1959 | Hanle et al. | 260—19 |
| 2,003,291 | 6/1935 | Hill | 260—52 |
| 2,430,002 | 11/1947 | De Groote et al. | 252—342 |
| 2,499,361 | 3/1950 | De Groote et al. | 260—410.5 |
| 2,897,165 | 7/1959 | Rowland et al. | 260—19 |
| 2,979,533 | 4/1961 | Bruson et al. | 260—613 |
| 2,985,615 | 5/1961 | Tunteler | 260—45.4 |
| 3,140,221 | 7/1964 | Liebling et al. | 161—195 |
| 3,214,491 | 10/1965 | Stanton | 260—871 |
| 3,283,030 | 11/1966 | Bean et al. | 260—842 |
| 3,331,730 | 7/1967 | Bean et al. | 161—192 |

FOREIGN PATENTS 909,777  12/1962  Great Britain.

OTHER REFERENCES

Netherlands application 6,506,866, Nov. 30, 1965, cited in Chem. Abstracts, vol. 64, 1966, 14384b–d, Hooker.

British Patent 909,777, cited in Chem. Abstracts, vol. 58, 1963, 3610h, 3611a–b, Distillers Company.

HAROLD D. ANDERSON, Primary Examiner

HOWARD SCHAIN, Assistant Examiner

U.S. Cl. X.R.

260—31.8, 33.6, 53, 613, 848